United States Patent [19]
Ballard

[11] Patent Number: 4,685,684
[45] Date of Patent: Aug. 11, 1987

[54] DYNAMIC SEAL

[76] Inventor: Michael J. Ballard, P.O. Box 15384, Baton Rouge, La. 70895

[21] Appl. No.: 830,513

[22] Filed: Feb. 14, 1986

[51] Int. Cl.$^4$ .................. F16J 15/447; F16J 15/54
[52] U.S. Cl. .................................. 277/57; 277/53; 277/68; 277/94; 277/96.1; 277/135; 277/190; 277/193
[58] Field of Search ............... 277/13, 14 R, 14 V, 277/25, 68, 79, 71, 74, 81 R, 94, 96.1, 193, 199, 135, 167.3, 57, 53, 190, 67, 15, 69

[56] References Cited
U.S. PATENT DOCUMENTS

| | | | |
|---|---|---|---|
| 822,802 | 6/1906 | Wilkinson | 277/14 |
| 853,059 | 5/1907 | Bunge | 277/57 |
| 1,394,959 | 10/1921 | Wilkinson | 277/13 |
| 2,247,505 | 7/1941 | Kohler | 277/81 X |
| 2,402,033 | 6/1946 | Flinn | 277/96.1 X |
| 2,738,208 | 3/1956 | Mylander | 277/81 X |
| 2,824,759 | 2/1958 | Tracy | 277/15 |
| 3,383,116 | 5/1968 | Carter | 277/96.1 |
| 3,498,620 | 3/1970 | Wiese | 277/15 X |
| 3,640,541 | 2/1972 | Taschenberg | 277/96.1 |
| 3,744,805 | 7/1972 | Heinrich | 277/96.1 |

FOREIGN PATENT DOCUMENTS 1470057   1/1967   France .................. 277/57

Primary Examiner—Allan N. Shoap
Attorney, Agent, or Firm—Robert C. Tucker; William David Kiesel

[57] ABSTRACT

A dynamic seal is provided, comprising a gland, fixedly connectible to a housing around a rotatable shaft and having a first side, facing interior of the housing; a second side, facing exterior of the housing; a center opening, communicating between the first and second sides; and having a diameter greater than that of the shaft; an annular inner face, countersunk into the second side adjacent to the center opening so as to form an interior groove between the shaft and the gland; an annular first flange, extending axially from the inner face; and at least one relief port, communicating between the interior groove and the exterior of the gland. The seal also comprises a rotating member, fixedly connectible to the rotatable shaft and having a first face, facing toward the second side of the gland; a second face, facing away from the gland; an outer annular surface between the first face and the second face, an outer annular diameter such that the rotating member will fit within the interior groove of the gland; an annular sealing groove, having an inner wall and an outer wall, positioned in the first face so as to matingly receive the first flange of the gland and permit relative movement therebetween; a plurality of first indentations on the outer annular surface; and a central shaft opening having a diameter just greater than the shaft.

19 Claims, 5 Drawing Figures

DYNAMIC SEAL

BACKGROUND OF INVENTION

1. Field of Invention

This invention relates generally to devices which provide a seal between a rotatable shaft and a housing and, more particularly, to such devices which accomplish sealing utilizing the dynamic effect of rotating parts.

2. Prior Art

Various types of sealing devices are utilized to provide a seal along a rotatable shaft between the interior and exterior of a housing. In the case of pumps and other such devices; lubricating oil, the product being pumped, or other substances are contained under pressure within the housing. Sealing elements help to contain the substances within the housing and prevent them from contaminating the environment outside the housing. Often, the temperature, pressure and/or chemical composition of the substance within the housing renders the substance extremely dangerous should it escape into the environment.

In such applications, the most commonly used sealing device is a mechanical seal. Generally, a mechanical seal comprises a rotating assembly (commonly known as a rotor assembly) fixed to the shaft, and a stationary assembly (known as a stator), against which a moving surface on the rotor bears, thus establishing a seal. In order to provide the desired sealing effect, the rotor and stator must be precisely fixed in their relative positions. The position of the mechanical seal is fixed by a housing known as a stuffing box, which has studs protruding therefrom generally parallel to the shaft. Bolted to the stuffing box studs is a gland housing. The stuffing box and gland housing, when bolted together, house the seal rotor and stator. The sealing surfaces between the rotor and stator will eventually wear to a point of failure, necessitating inspection and replacement. Premature failure can result from misalignment, product destruction of sealing surfaces and defective sealing surfaces as well as other causes. Seal failure will often result in rupture, wherein lubricants and/or products are spilled or sprayed under pressure into the environment. Aside from the obvious danger to personnel, seal failures often have severe economic consequences such as clean-up costs, plant down time, pump and seal replacement costs and lost product costs.

Other types of sealing devices are currently on the market. Failure of such other devices will have similar results to those stated above. All sealing devices currently on the market will have a certain degree of leakage, and designs are currently built around an accepted leakage factor.

SUMMARY OF INVENTION

Therefore, it is an object of this invention to provide a dynamic sealing device which will provide a back-up to a conventional sealing device in case of failure of the conventional device.

It is another object of this invention to provide a dynamic sealing device which will utilize the forces generated by shaft rotation to maintain a pressurized fluid within a housing, without surface contact between sealing elements.

It is still another object of this invention to provide a dynamic sealing device which is economically competitive with conventional sealing devices.

It is a further object of this invention to provide such a dynamic sealing device which will also prevent contamination of fluids within a housing from the environment.

Accordingly, a dynamic sealing device is provided, comprising a gland, fixedly connectible to a housing around a rotatable shaft and having a first side facing interior of the housing; a second side facing exterior of the housing; a center opening communicating between the first and second sides and having a diameter greater than that of the shaft; an annular inner face, countersunk into the second side adjacent to the center opening so as to form an interior groove between the shaft and the gland; an annular first flange, extending axially from the inner face; and at least one relief port, communicating between the interior groove and the exterior of the gland. The seal also comprises a rotating member, fixedly connectible to the rotatable shaft and having a first face facing the second side of the gland; a second face facing away from the gland; an outer annular surface between the first face and the second face; an outer diameter such that the rotating member will fit within the interior groove of the gland; an annular sealing groove having an inner wall and an outer wall, positioned in the first face so as to matingly receive the first flange of the gland and permit relative movement therebetween; a plurality of first indentations on the outer annular surface; and a central shaft opening having a diameter just greater than the shaft.

DETAILED DESCRIPTION OF PREFERRED EMBODIMENTS OF THE INVENTION

Figure 1:
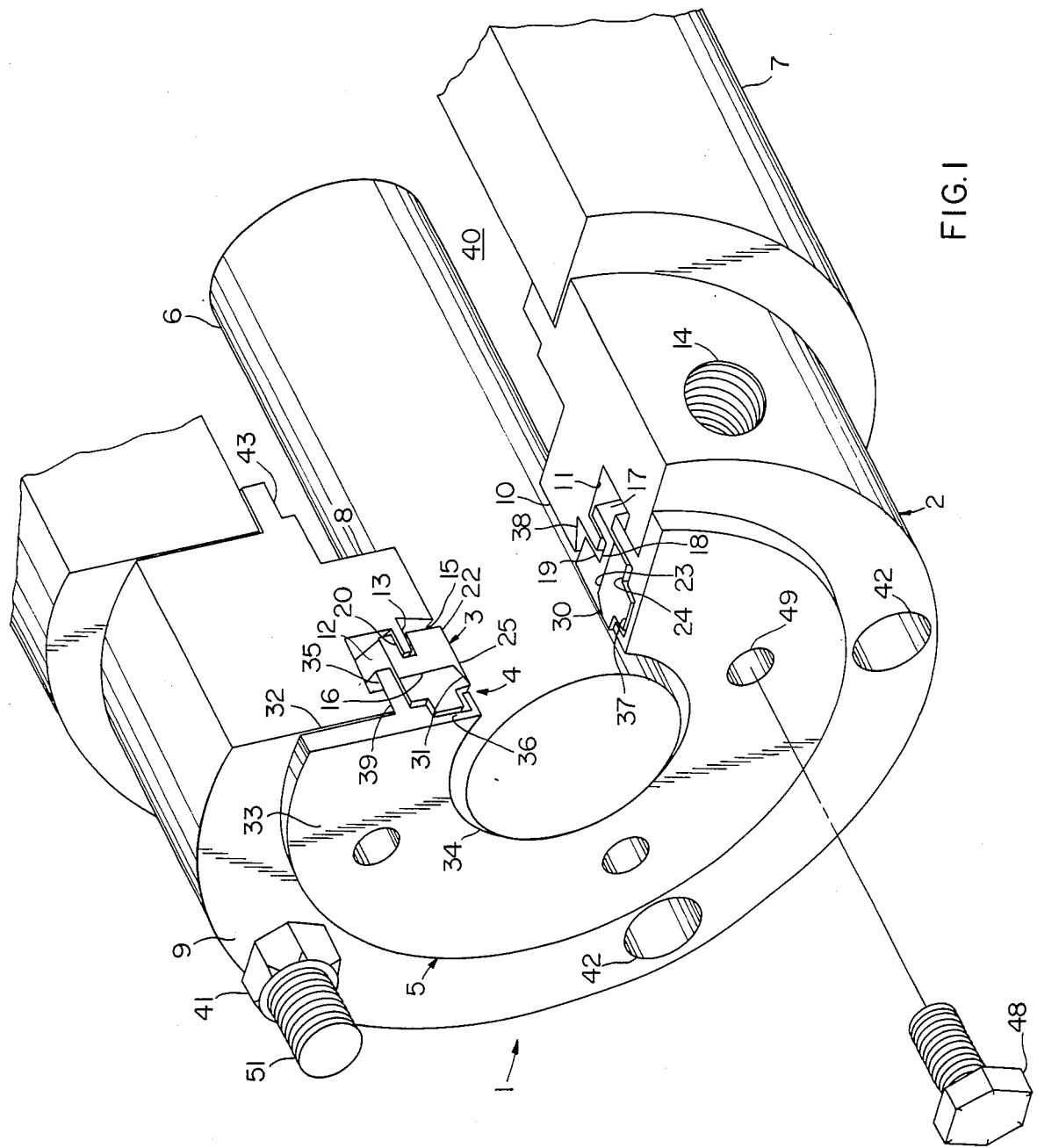
FIG. 1 is a cutaway perspective view of a preferred embodiment of the dynamic seal of this invention.

As shown in FIG. 1, the dynamic seal 1 provides a seal between a housing 7 and a rotatable shaft 6. The seal 1 generally comprises a gland 2, which is fixedly attachable to housing 7, and a rotating member 3, which is fixedly attachable to shaft 6. Preferably, rotating member 3 is fixed in place on shaft 6 by a locking member 4.

For purposes herein the term "shaft" shall include any part which may cover the shaft and rotate therewith, such as the sleeve of a cartridge mounted mechanical seal. Preferably, cap member 5 is fixedly attachable to gland 2 to provide an additional sealing effect. The action of rotating member 3 establishes a flow of fluid from the interior 40 of housing 7 out through relief ports 14 in gland 2 to a desired location. The design of the seal 1 prevents leakage from housing 7 without the contacting surfaces of prior art mechanical seals. Thus, the seal 1 will last indefinitely.

Gland 2 is preferably fixed to housing 7 by housing studs entering through gland stud holes 42 fix by stud nuts 41. Gland mounting flange 43, or other suitable means, is provided on gland 2 for additional guidance onto housing 7. Gland 2 has a first side 8, facing the interior 40 of housing 7, and a second side 9, facing exterior to the housing 7. A center opening 10 is provided which has a greater diameter than that of shaft 6 so as to permit free rotation of the shaft 6. An annular inner face 11 is countersunk into second face 9, forming an interior groove 12. An annular first flange 13 extends axially into interior groove 12 from inner face 11. At least one relief port 14 communicates between interior groove 12 and the exterior of gland 2. Piping (not shown) connects relief port 14 back to the interior 40 of housing 7, to a product pipeline (not shown) or to some other desired location. It is preferable that an annular angular indentation 38 is provided in the portion of inner face 11 between first flange 13 and shaft 6. Angular indentation 38 has been found to improve the operating dynamics of the seal 1. Rotating member 3, shown in FIGS. 1, 2, 3 and 4 establishes the sealing dynamics of the seal 1 when combined with gland 2. Rotating member 3 is fixedly attachable to shaft 6 and rotates therewith when attached. The diameter of central shaft opening 22 is just larger than that of shaft 6 so as to permit installation. Preferably, rotating member 3 is of an outer diameter so as to be encased by interior groove 12 as shown in the Figures. Rotating member 3 has a first face 15, facing inner face 11 of gland 2, a second face 16, facing away from gland 2, and an outer surface 17. An annular sealing groove 18 is provided in first face 15, and is preferably of a similar cross section and just larger than first flange 13 of gland 2, since rotating member 3 must not contact gland 2. Sealing groove 18 has an inner wall 19 and an outer wall 20. As shown in the Figures, first flange 13 extends into sealing groove 18 when the seal 1 is installed.

Figure 2:
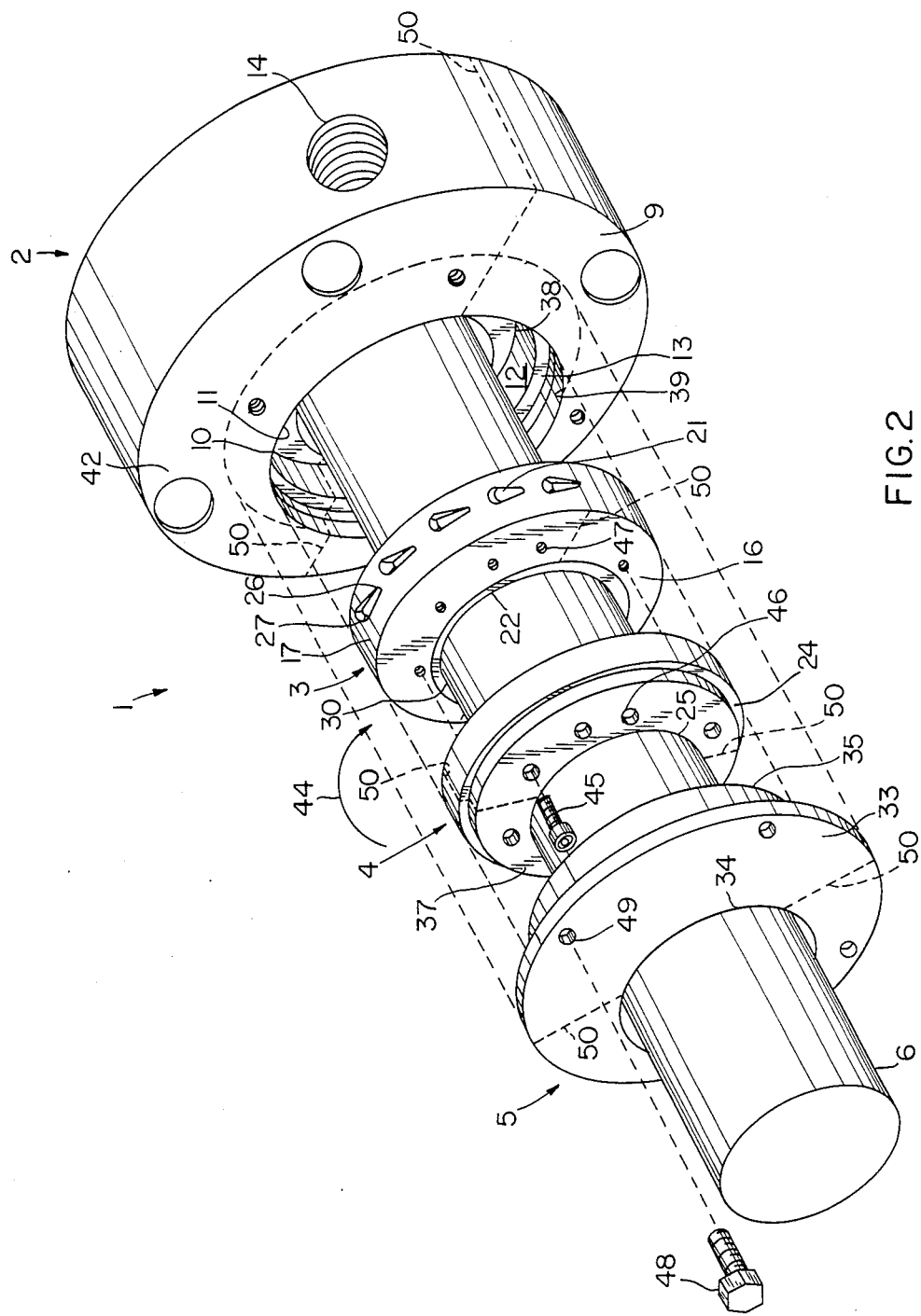
FIG. 2 is an exploded perspective view of a preferred embodiment of the invention.
Figure 4:
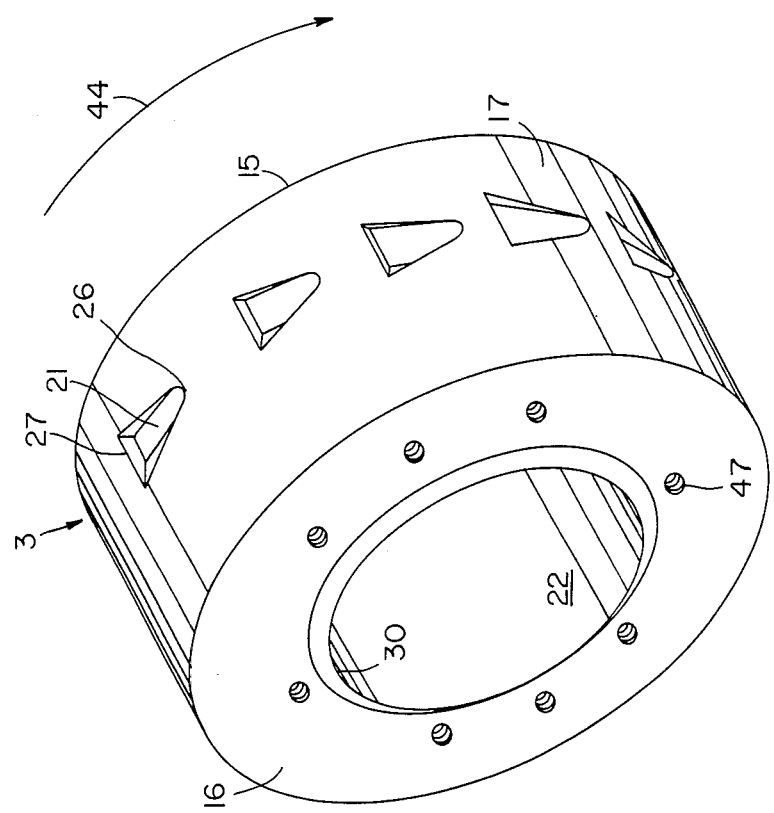
FIG. 4 is a back perspective view of a preferred embodiment of the rotating member of this invention.
Figure 3:
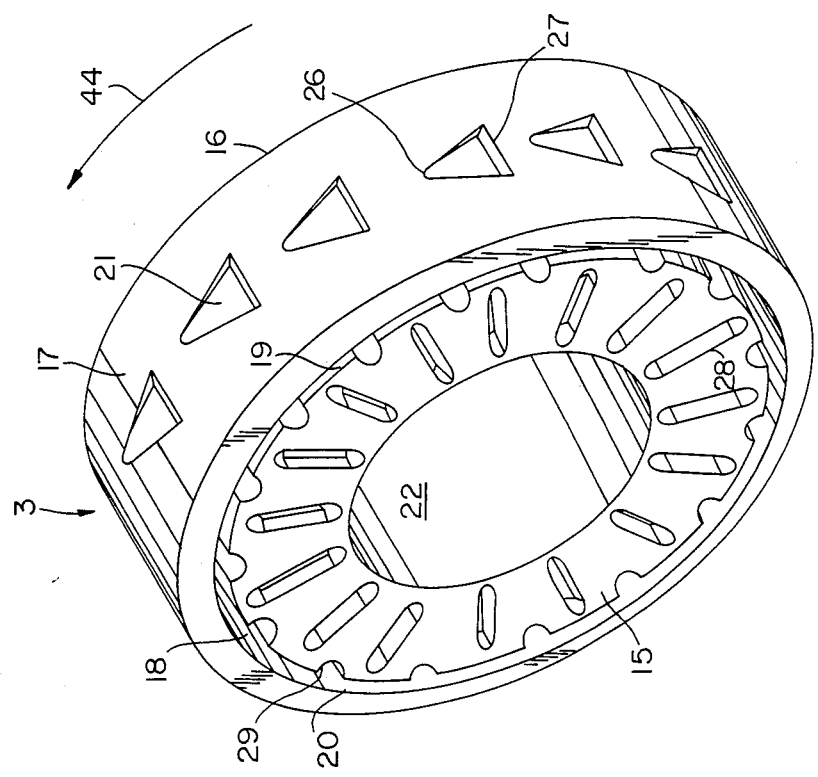
FIG. 3 is a front perspective view of a preferred embodiment of the rotating member of this invention.

The sealing dynamics of seal 1 are enhanced by a plurality of first indentations 21 on outer surface 17. As rotating member 3 rotates, first indentations 21 create a pumping action to confine fluids in interior groove 12 and establish a flow through relief ports 14. It is preferable, as shown in FIGS. 2 and 3, that first indentations 21 be generally triangular in shape with the apex 26 pointing in the direction of rotation shown by rotation arrows 44. A rounded, cup-shaped base 27 encourages a dynamic scooping effect. It is also preferable that the depth of each first indentation 21 vary from deep at the base 27 to shallow at the apex 26. Further sealing dynamics are provided by a plurality of second indentations 28 in first face 15 of rotating member 3. Second indentations 28 are preferably oval in shape, as shown in FIG. 3. A plurality of third indentations 29 are preferably provided in the inner wall 19 of sealing groove 18. Third indentations 29 are preferred to be semi-cylindrical in section, as shown in FIGS. 3. As previously stated, the indentations 21, 28 and 29 all serve to confine fluids in interior groove 12.

Figure 5:
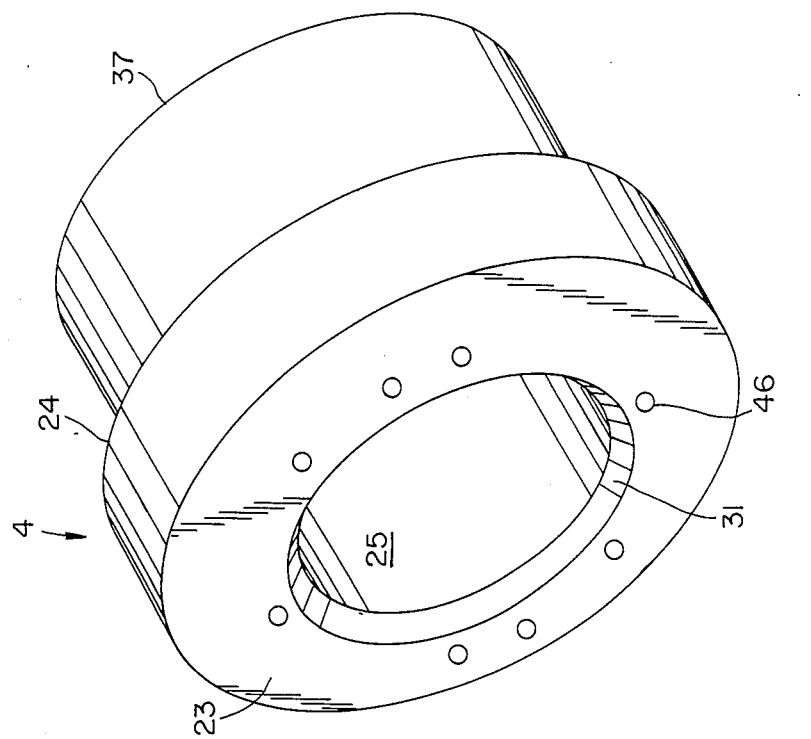
FIG. 5 is a front perspective view of a preferred embodiment of the locking member of this invention.

Rotating member 3 may be fixedly attached to shaft 6 in various ways known in the art. It is preferable, however that a locking member 4, shown in FIGS. 1, 2, and 5, be utilized to fix the position of rotating member 3. As with rotating member 3, locking member 4 has a first face 23 facing the rotating member 3, a second face 24 facing away from rotating member 3, and a central shaft opening 25. Locking member 4 is fixed in place by locking bolts 45, which extend through locking holes 46 and are secured in threaded holes 47 in rotating member 3. A firm grip on shaft 6 is provided by an angular flange 30 on rotating member 3 and an angular groove 31 on locking member 4. Angular groove 31 is preferably of a slightly smaller diameter than angular flange 30 such that, as locking bolts 45 are tightened, angular groove 31 is drawn over angular flange 30, tightening rotating member 3 on shaft 6.

Cap member 5 provides a containment means for the sealing structure defined by rotating member 3 and gland 2. Cap member 5 is fixedly attachable to gland 2 utilizing cap bolts 48 and cap bolt holes 49. Cap member 5 has an inner face 32, an outer face 33 and a central opening 34 through which shaft 6 passes. An enclosure flange 35 extends axially inward from inner face 32 just to the outside of rotating member 3 (and locking member 4, if applicable), thus providing further containment of fluids in interior groove 12. A more complex migration path between rotating and non-rotating parts is provided by an annular groove 36 in the inner face 32 of cap member 5. The second face 24 of locking member 4 is correspondingly provided with a flange 37 which extends matingly into the annular groove 36 without touching cap member 5. Of course, if locking member 4 is not utilized, flange 37 could be provided on second face 16 of rotating member 3. A second flange 39 on gland 2 may be provided to enhance the fit of enclosure flange 35 as shown.

Thus, the rotating unit comprising the rotating member 3 and locking member 4 is contained by a stationary unit comprising gland 2 and cap member 5. The pressure created by the pumping action of indentation 21, 28 and 29 causes fluids within housing 7 which flow into interior groove 12 to be routed through relief ports 14 to a desired location. Very small tolerances are preferred between locking member 4 and cap member 5, establishing a complex path through which fluid must flow in order to leak from the seal 1. Because of the dynamics created by this configuration, fluid flow will follow the path of least resistance through relief ports 14. Testing of the embodiment shown in the Figures has yielded no leakage from a housing pressurized with water in excess of 100 p.s.i.g., at a rotation speed of approximately 1750 r.p.m. As stated previously, annular angular indentation 38 was found to add to the sealing properties of the seal 1.

In order to facilitate installation, each major seal component may be split into half, as illustrated by split lines 50 on gland 2, rotating member 3, locking member 4 and cap members 5. As opposed to prior art devices, it is possible to split these major components because there are no contact surfaces between stationary and rotating components, and there is no necessity for secondary seals, such as o-rings or packing.

Thus, a dynamic seal 1 is provided which does not have contacting surfaces. It is easily installable and should last indefinitely. The dynamic seal of this invention may be substituted for mechanical seals in some applications. The seal 1 may also be installed as a backup to conventional seals for safety protection in case of main seal failure. Such installations will prove invaluable in situations where hazardous materials are contained within housing 7. A plurality of seals 1 may even be installed in series to provide successive seals for redundancy. The seal 1 may be employed in any desirable sealing application. For example, the seal 1 could be used in automotive applications as a shaft seal to maintain oil in an engine housing. It should be understood here that the term "W'housing" is illustrative only, and is intended to include any fixed structure between which structure and a shaft a seal is provided.

Accordingly, the seal 1 could be employed in a reverse direction to contain fluids exterior to housing 7. Of course, in such a situation, the "interior" 40 of housing 7 would be on the opposite side of the seal 1. As can be seen, there are many applications and embodiments of the invention which will occur to those skilled in the art, and which are intended to be within the scope and spirit of the following claims.

I claim:

1. A dynamic sealing device, comprising:
   a. a gland, fixedly connectible to a housing around a rotatable shaft and having:
      i. a first side, facing interior of said housing;
      ii. a second side, facing exterior of said housing;
      iii. a center opening, communicating between said first and second sides and having a diameter greater than that of said rotatable shaft;
      iv. an annular inner face, countersunk into said second side adjacent to said center opening so as to form an interior groove between said shaft and said gland;
      v. an annular first flange, extending axially from said inner face; and
      vi. at least one relief port, communicating between said interior groove and the exterior of said gland;
   b. a rotating member, fixedly connectible to said rotatable shaft and having:
      i. a first face, facing toward said second side of said gland;
      ii. a second face, facing away from said gland;
      iii. an outer annular surface between said first face and said second face;
      iv. an outer diameter such that said rotating member will fit within said interior groove of said gland;
      v. an annular sealing groove, having an inner wall and an outer wall, positioned in said first face so as to matingly receive said first flange of said gland and permit relative movement therebetween;
      vi. a plurality of first indentations on said outer annular surface; and
      vii. a central shaft opening having a diameter just greater than said shaft.

2. A dynamic sealing device according to claim 1, further comprising a locking member fixedly attachable to said rotating member so as to fix the position of said rotating member on said shaft, said locking member further having a first face facing said rotating member, a second face facing away from said rotating member and a central shaft opening having a diameter just greater than said shaft.

3. A dynamic sealing device according to claim 2, wherein said second face of said rotating member is provided with an angular flange extending from said second face axially adjacent said shaft, and wherein said first face of said locking member is provided with an angular groove axially adjacent said shaft, said angular groove having a shape slightly smaller than said angular flange.

4. A dynamic sealing device according to claim 2, further comprising a cap member fixedly attachable to said gland and having an inner face facing said gland, an outer face facing away from said gland and a central opening of greater diameter than said shaft, said cap member having an enclosure flange extending axially inward into said interior groove of said gland just to the outside of said locking member and said rotating member.

5. A dynamic sealing device according to claim 4, wherein said inner face of said cap member is provided with an annular groove and said second face of said locking member is provided with a flange extending axially into said annular groove in said cap member without touching said cap member.

6. A dynamic sealing device according to claim 5, wherein said gland is provided with a second flange extending radially inward from said interior groove to said enclosure flange of said cap member.

7. A dynamic sealing device according to claim 4, wherein said gland, said rotating member, said locking member and said cap member are split.

8. A dynamic sealing device according to claim 2, further comprising a cap member fixedly attachable to said gland and having an inner face facing said gland, an outer face facing away from said gland and a central opening of greater diameter than said shaft, said cap member having an enclosure flange extending axially inward into said interior groove of said gland just to the outside of said rotating member.

9. A dynamic sealing device according to claim 8, wherein said inner face of said cap member is provided with an annular groove and said second face of said locking member is provided with a flange extending axially into said annular groove in said cap member without touching said cap member.

10. A dynamic sealing device according to claim 8, wherein said gland, said rotating member and said cap member are split.

11. A dynamic sealing device according to claim 2, wherein said gland, said rotating member and said locking member are split.

12. A dynamic sealing device according to claim 1, wherein each first indentation on said outer annular surface is in the general shape of a triangle, with the apex of said triangle pointing in the direction of rotation of said shaft.

13. A dynamic sealing device according to claim 12, wherein the depth of each first indentation varies from deep at the base of said triangle to shallow at the apex of said triangle.

14. A dynamic sealing device according to claim 1, wherein said first face of said rotating member is provided with a plurality of second indentations between said sealing groove and said shaft.

15. A dynamic sealing device according to claim 14, wherein each second indentation on said first face is oval in shape.

16. A dynamic sealing device according to claim 1, wherein said inner wall of said sealing groove is provided with a plurality of third indentations.

17. A dynamic sealing device according to claim 16, wherein each third indentation on said inner wall of said sealing groove is semi-cylindrical in section.

18. A dynamic sealing device according to claim 1, wherein the portion of said inner face of said gland between said first flange and said shaft is provided with an annular angular indentation adjacent said first flange.

19. A dynamic sealing device according to claim 1, wherein said gland and said rotating member are split.

* * * * *